(12) United States Patent
Zhu et al.

(10) Patent No.: US 11,817,681 B1
(45) Date of Patent: Nov. 14, 2023

(54) ELECTRIFIED WIRE LIFTING DEVICE

(71) Applicant: HONGHE POWER SUPPLY BUREAU OF YUNNAN POWER GRID CO., LTD, Mengzi (CN)

(72) Inventors: Guofu Zhu, Mengzi (CN); Congzhi Wang, Mengzi (CN); Gang Liu, Mengzi (CN); Qing Wei, Mengzi (CN); Jingtao Tang, Mengzi (CN); Zhouqiang Lin, Mengzi (CN); Quanlin Li, Mengzi (CN); Liguo Sun, Mengzi (CN); Zongfu Chang, Mengzi (CN); Zhao Zhou, Mengzi (CN); Shaochao Kang, Mengzi (CN); Yongsheng Yang, Mengzi (CN); Jin Li, Mengzi (CN); Xu Wang, Mengzi (CN); Telin Ba, Mengzi (CN); Tianyu Cao, Mengzi (CN); Ping Zhang, Mengzi (CN)

(73) Assignee: HONGHE POWER SUPPLY BUREAU OF YUNNAN POWER GRID CO., LTD, Mengzi (CN)

( * ) Notice: Subject to any disclaimer, the term of this patent is extended or adjusted under 35 U.S.C. 154(b) by 0 days.

(21) Appl. No.: 18/322,006

(22) Filed: May 23, 2023

(30) Foreign Application Priority Data

Sep. 13, 2022 (CN) .......................... 202211107492.5

(51) Int. Cl.
*H02G 1/04* (2006.01)
*B66F 3/08* (2006.01)

(52) U.S. Cl.
CPC .................. *H02G 1/04* (2013.01); *B66F 3/08* (2013.01); *B66F 2700/09* (2013.01)

(58) Field of Classification Search
CPC ...... B66F 13/00; B66F 19/00; B66F 2700/04; B66F 2700/09; B66F 3/00; B66F 3/08; B66F 3/10; H02G 1/02; H02G 1/04; H02G 7/00; H02G 7/02; H02G 7/04; H02G 7/20; H02G 7/205
See application file for complete search history.

(56) References Cited

U.S. PATENT DOCUMENTS

| 4,466,506 A | 8/1984 | Dolenti |
| 5,183,168 A | 2/1993 | Fujimoto |

FOREIGN PATENT DOCUMENTS

| CN | 101888069 A | | 11/2010 | |
| CN | 102916372 A | | 2/2013 | |
| CN | 104037665 A | * | 9/2014 | ............... H02G 1/02 |
| CN | 206340900 U | | 7/2017 | |
| CN | 107459004 A | | 12/2017 | |
| CN | 110697590 A | | 1/2020 | |
| CN | 111392631 A | | 7/2020 | |
| CN | 213753774 U | | 7/2021 | |
| CN | 113415753 A | | 9/2021 | |

(Continued)

*Primary Examiner* — Tyrone V Hall, Jr.
(74) *Attorney, Agent, or Firm* — Daniel M. Cohn; Howard M. Cohn

(57) ABSTRACT

The present disclosure provides an electrified wire lifting device, including a locking assembly fixed on a bracket of an electric pole for integrally fixing the device; a connecting assembly having one end used for clamping a wire; a lifting assembly mounted on the top of the locking assembly. The present disclosure can adjust the lateral position, so that the wire is lifted; and the lifted connecting assembly is locked and fixed to avoid shaking thereof.

4 Claims, 3 Drawing Sheets

(56) References Cited

FOREIGN PATENT DOCUMENTS

| | | | | |
|---|---|---|---|---|
| CN | 214153770 | U | 9/2021 | |
| CN | 113824047 | A | 12/2021 | |
| CN | 215989997 | U | 3/2022 | |
| CN | 114725829 | A | 7/2022 | |
| JP | 2015019482 | A | 1/2015 | |
| JP | 2019170125 | A | 10/2019 | |
| KR | 20130121398 | A * | 11/2013 | ............... H02G 1/02 |
| KR | 101955155 | B1 * | 3/2019 | ............... H02G 1/02 |

* cited by examiner

ELECTRIFIED WIRE LIFTING DEVICE

TECHNICAL FIELD

The present disclosure relates to the field of electrified maintenance for distribution networks, in particular to an electrified wire lifting device.

BACKGROUND

The lifting of wires is indispensable in wire service. According to the traditional construction method, the staff remove the wires by holding tools by hand and then lift them. This method is not only time-consuming and labor-intensive, but also has safety risks, and holding tools by hand affects other operation behaviors of the staff.

In order to improve the lifting effect of the wires, there are various methods in the prior art, and it is common to perform automatic lifting through the cooperation of a hook with a pulley. Although this method is more convenient than manual operation, there are still many problems. Firstly, in case of lifting, the stability of the wire is insufficient, which is easy to cause the wire to shake, thereby causing a certain safety hazard. Secondly, lifting is performed vertically, which is not convenient to perform the lateral movement after lifting, which causes the transverse distance of the wire to be too close, thereby affecting the flexibility of wire lifting during maintenance.

SUMMARY

An objective of the present disclosure is to provide an electrified wire lifting device to solve the problems set forth in the above background.

In order to achieve the above objective, the present disclosure provides an electrified wire lifting device, including a locking assembly fixed to a bracket of an electric pole for integrally fixing the device;
  a connecting assembly having one end used for clamping a wire and the other end locked and fixed on the bracket of the electric pole by means of an adjusting assembly; and
  a lifting assembly mounted on the top of the locking assembly for performing a lifting movement on the connecting assembly at the top.

Preferably, the locking assembly includes a support plate, a bottom side of the support plate is provided with a hook for hanging on the bracket of the electric pole, a top end of the hook passes through the support plate and is provided with a threaded end, and a positioning nut is mounted outside the threaded end.

Preferably, a surface of the support plate is provided with an adjusting hole near an upper end of the hook for ensuring horizontal position adjustment of the hook.

Preferably, the lifting assembly includes a lifting motor having an output end provided with a worm, a worm wheel is provided outside the worm, a screw rod is tightly welded on the top of the worm wheel, a lifting rod is provided outside the screw rod, threads are provided inside the lifting rod, the screw rod is in threaded connection with the lifting rod, and a stopper sleeve is tightly welded outside the lifting rod; a stopper is mounted on one side of the stopper sleeve, a fixed sleeve is provided outside the bottom of the stopper sleeve in a sleeving manner, and the shape of the inner wall of the fixed sleeve is the same as the shape of the outer wall of the stopper sleeve, and is used for limiting the stopper sleeve to prevent the same from rotating.

Preferably, the top end of the lifting rod is rotatably connected to the middle part of the connecting assembly by means of a connecting shaft.

Preferably, a handle is mounted on the bottom of the locking assembly, and one end of the handle is connected to the bottom of the worm wheel for driving the screw rod to rotate and then driving the lifting rod to lift and drop.

Preferably, the connecting assembly includes a movable piece having one end connected with the lifting rod for lifting the wire by means of a socket, and the top of the outer end of the lifting rod is provided with a recess for clamping the wire.

Preferably, the adjusting assembly includes a fixed seat mounted on the other side of the movable piece, a rotating shaft is provided on the fixed seat, a belt is connected to the outside of the rotating shaft and bound to the bracket of the electric pole, and the other end is connected to the outside of the fixed seat, both ends of the rotating shaft pass through the side wall of the fixed seat and are mounted with a toothed disc, outer walls at both ends of the fixed seat are each provided with a bayonet, and the outside of the fixed seat is provided with an adjusting handle having one end capable of catching the bayonet of both ends of the fixed seat and the bayonet of the toothed disc to prevent the rotating shaft from rotating.

Compared with the prior art, the present disclosure has the beneficial effects:

In the electrified wire lifting device, the device can be locked and fixed on the bracket of the electric pole by means of the locking assembly provided therein, the lateral position can be adjusted, and after the adjustment, the hook can be used for locking; the lifting assembly drives the adjusting assembly to lift, so that the wire is lifted; the wire is connected by means of the connecting assembly; and the lifted connecting assembly is locked and fixed by means of the adjusting assembly to avoid shaking thereof.

Figure 1:
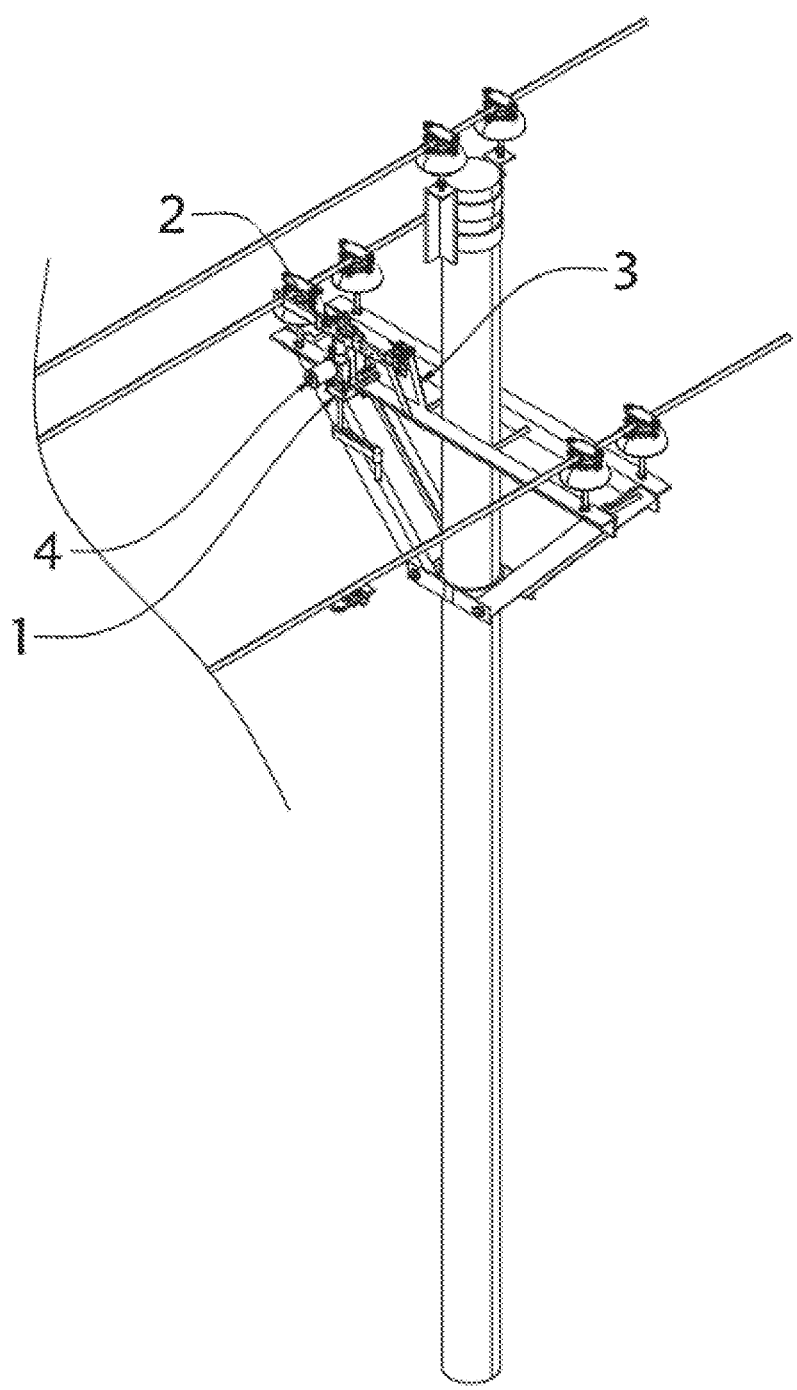
FIG. 1 is a schematic diagram of the use according to the present disclosure.

Each reference numeral in the figures has the following meaning:

1. locking assembly; 11. support plate; 12. hook; 121. positioning nut; 13. handle; 2. connecting assembly; 21. movable piece; 22. socket; 23. lifting rod; 231. recess; 3. adjusting assembly; 31. fixed seat; 32. toothed disc; 33. rotating shaft; 331. adjusting handle; 34. belt; 4. lifting assembly; 41. lifting motor; 411. worm; 42. worm wheel; 43. screw rod; 44. lifting rod; 441. connecting shaft; 45. stopper sleeve; 451. stopper; and 46. fixed sleeve.

DETAILED DESCRIPTION

The technical solutions of embodiments of the present disclosure will be described clearly and completely below in combination with the accompanying drawings of the embodiments of the present disclosure. Obviously, the embodiments described are only a part of, but not all embodiments of the present disclosure. Based on the embodiments of the present disclosure, all other embodiments obtained by a person of ordinary skill in the art without creative efforts shall fall within the protection scope of the present disclosure.

In the description of the present disclosure, it is to be understood that the terms "center", "longitudinal", "lateral", "length", "width", "thickness", "upper", "lower", "front", "back", "left", "right", "vertical", "horizontal", "top", "bottom", "inner", "outer", "clockwise", "counterclockwise" and the like, indicate orientations or positional relationships based on those shown in the drawings, merely for facilitating and simplifying the description of the present disclosure, rather than indicate or imply that the device or element referred to must have a specific orientation, and be constructed and operated in a specific orientation. Therefore, these are not to be construed as the limitation to the present disclosure.

Figure 2:
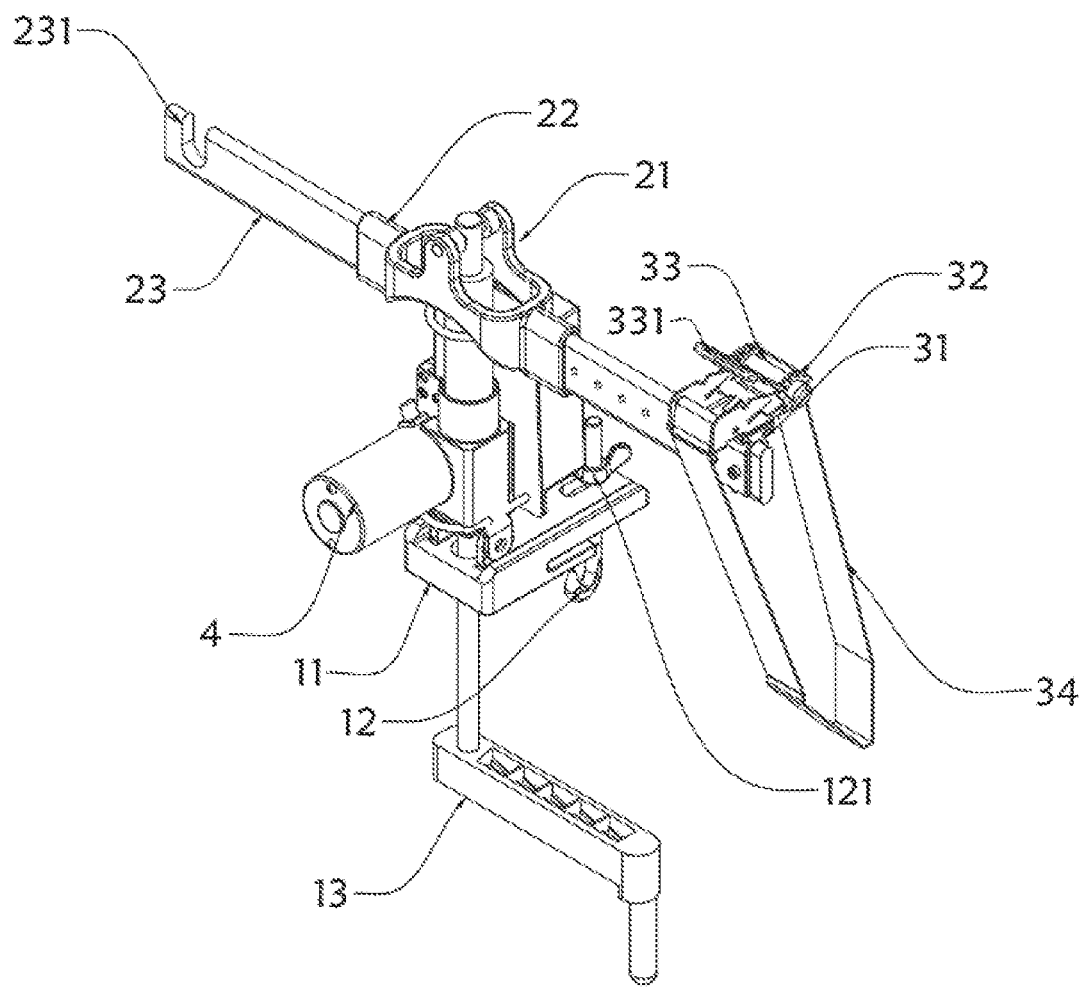
FIG. 2 is a schematic diagram of an overall structure according to the present disclosure.
Figure 3:
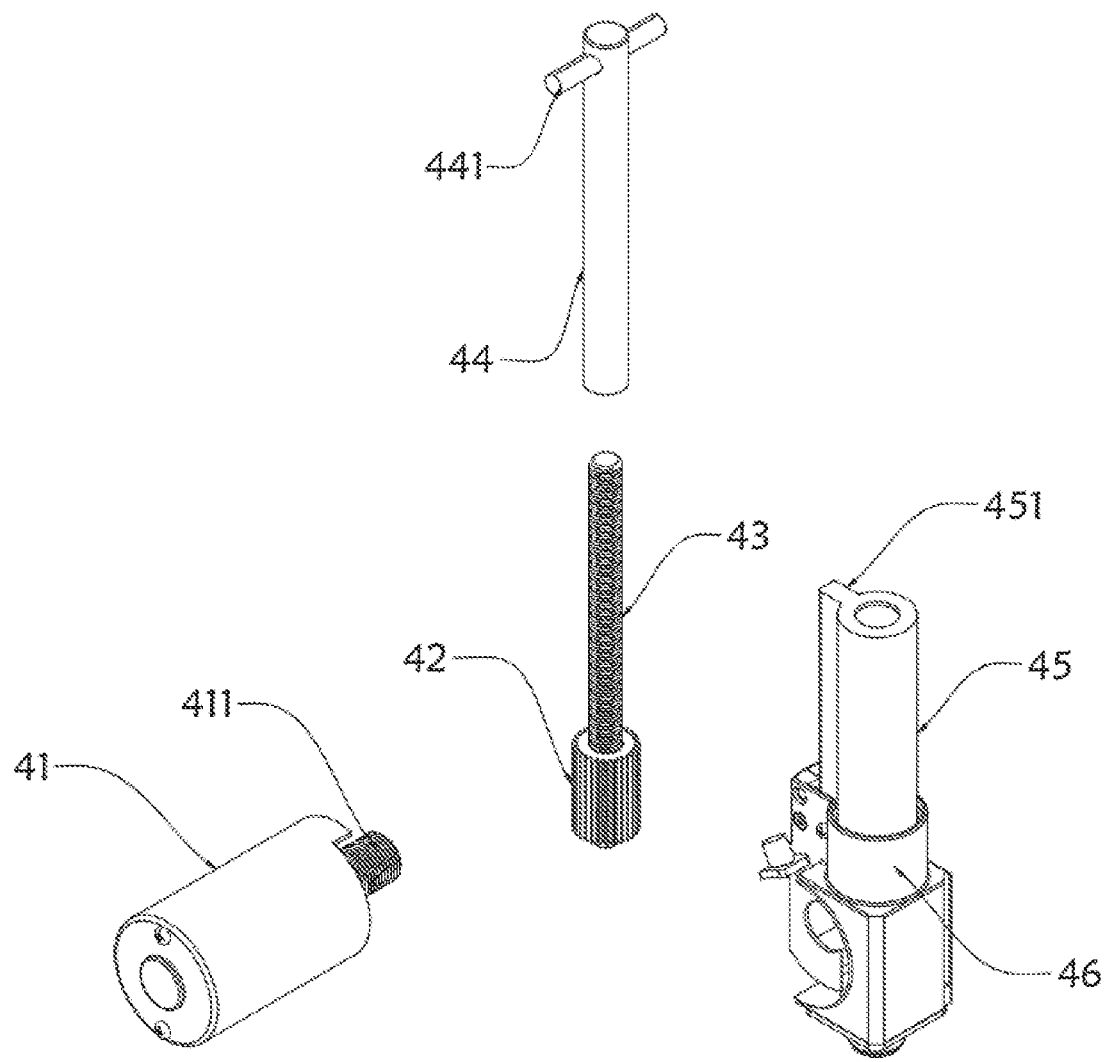
FIG. 3 is a schematic structural diagram of a lifting assembly according to the present disclosure.

The present disclosure provides an electrified wire lifting device, as shown in FIGS. 1-3, including a locking assembly 1 fixed on a bracket of an electric pole for integrally fixing the device; a connecting assembly 2 having one end used for clamping a wire and the other end locked and fixed on the bracket of the electric pole by means of an adjusting assembly 3; and a lifting assembly 4 mounted on the top of the locking assembly 1 for performing a lifting movement on the connecting assembly 2 at the top.

In this embodiment, the locking assembly 1 includes a support plate 11 having one side provided with a slot inserted into one side of the bracket of the electric pole. One side of the bottom of the support plate 11 is provided with a hook 12 for hanging on the bracket of the electric pole, the top end of the hook 12 passes through the support plate 11 and is provided with a threaded end. A positioning nut 121 is mounted outside the threaded end, and the hook 12 can be clamped and fixed with the bracket of the electric pole by tightening the positioning nut 121, thereby ensuring that the locking assembly 1 is fixed on the bracket of the electric pole.

Specifically, a surface of the support plate 11 is provided with an adjusting hole near the upper end of the hook 12 for ensuring the horizontal position adjustment of the hook 12.

Further, the lifting assembly 4 includes a lifting motor 41 having an output end provided with a worm 411. A worm wheel 42 is provided outside the worm 411 driving the worm wheel 42 to rotate, a screw rod 43 is tightly welded on the top of the worm wheel 42, a lifting rod 44 is provided outside the screw rod 43, and threads are provided inside the lifting rod 44. The screw rod 43 is in threaded connection with the lifting rod 44 driven to perform a lifting movement by the rotation of the screw rod 43, and a stopper sleeve 45 is tightly welded outside the lifting rod 44. A stopper 451 is mounted on one side of the stopper sleeve 45, a fixed sleeve 46 is provided outside the bottom of the stopper sleeve 45 in a sleeving manner, and the shape of the inner wall of the fixed sleeve 46 is the same as the shape of the outer wall of the stopper sleeve 45, and is used for limiting the stopper sleeve 45 to prevent the same from rotating.

Further, the top end of the lifting rod 44 is rotatably connected to the middle part of the connecting assembly 2 by means of a connecting shaft 441, and the connecting assembly 2 can flexibly perform a lever movement so that one end thereof drives the wire to be lifted.

Further, a handle 13 is mounted on the bottom of the locking assembly 1, and one end of the handle 13 is connected to the bottom of the worm wheel 42 for driving the screw rod 43 to rotate, and then driving the lifting rod 44 to lift and drop to achieve manual lifting of the wire.

Further, the connecting assembly 2 includes a movable piece 21 having one end connected to a lifting rod 23 for lifting the wire by means of a socket 22. The top of the outer end of the lifting rod 23 is provided with a recess 231 for clamping the wire to facilitate the clamping of the wire so as not to move, and the lifting rod 23 is made of an insulating material to prevent the lifting rod 23 from being electrified, causing a safety accident.

Further, the adjusting assembly 3 includes a fixed seat 31 mounted on the other side of the movable piece 21. A rotating shaft 32 is provided on the fixed seat 31, a belt 34 is connected to the outside of the rotating shaft 32 and bound to the bracket of the electric pole, and the other end is connected to the outside of the fixed seat 31. Both ends of the rotating shaft 32 pass through the side wall of the fixed seat 31 and are mounted with a toothed disc 32. Outer walls at both ends of the fixed seat 31 are each provided with a bayonet, and the outside of the fixed seat 31 is provided with an adjusting handle 331 having one end capable of catching the bayonet of both ends of the fixed seat 31 and the bayonet of the toothed disc 32 to prevent the rotating shaft 32 from rotating.

When the electrified wire lifting device of the present disclosure is in use, firstly, one side of the support plate 11 is inserted into one side of the bracket of the electric pole by means of the slot, and is hung on the bracket of the electric pole by means of the hook 12. The hook 12 and the bracket of the electric pole can be clamped and fixed by tightening the positioning nut 121 to ensure that the locking assembly 1 is fixed on the bracket of the electric pole. Then, the lifting motor 41 drives the worm 411 to rotate, and then drives the worm wheel 42 to rotate, and then drives the lifting rod 44 to perform the lifting movement by means of the rotation of the screw rod 43, so that the recess 231 of the connecting assembly 2 clamps the wire so as not to move. Then, the wire is lifted, the lifting motor 41 is turned off after completing lifting into position, the belt 34 is bound to the bracket of the electric pole, and the rotating shaft 32 is rotated so that the belt 34 is tightly bound, then the bayonet of the both ends of the fixed seat 31 and the bayonet of the toothed disc 32 are clamped by one end of the adjusting handle 331 so that the rotating shaft 32 does not rotate, thereby ensuring the fixing after the wire is lifted, and after the wire is lifted, the horizontal fixed position thereof can be changed after the support plate 11 is loosened, thereby adjusting the horizontal position of the wire after lifting.

Finally, it needs to be stated that the electronic components in the lifting motor and the like in this embodiment are all common standard components or components known to a person skilled in the art, and the structure and principle thereof can be learned by a person skilled in the art through a technical manual or through conventional experimental methods; where the device is idle, all the above-mentioned electrical components are respectively connected by means of the wires, and the specific connection means is necessary to refer to the above-mentioned working principle that the electrical connections between electrical components are completed according to the working order, which are all known techniques in the art.

The foregoing has shown and described the basic principles, principal features, and advantages of the present disclosure. It should be understood by a person skilled in the art that the present disclosure is not limited by the above-described embodiments, and that the above-described embodiments and descriptions in the specification are merely preferred examples of the present disclosure and are not intended to limit the present disclosure, and that various changes and modifications may be made therein without departing from the spirit and scope of the present disclosure and fall within the protection scope of the present disclosure. It is intended that the scope of the disclosure be defined by the claims appended hereto and their equivalents.

What is claimed is:

1. An electrified wire lifting device, comprising:
a locking assembly (1) fixed on a bracket of an electric pole for integrally fixing the device;
a connecting assembly (2) having one end used for clamping a wire and the other end locked and fixed on the bracket of the electric pole by means of an adjusting assembly (3); and
a lifting assembly (4) mounted on the top of the locking assembly (1) for performing a lifting movement on the connecting assembly (2) at the top;
wherein the locking assembly (1) comprises a support plate (11), a hook (12) is provided on one side of the bottom of the support plate (11) for hanging on the bracket of the electric pole, a top end of the hook (12) passes through the support plate (11) and is provided with a threaded end, and a positioning nut (121) is mounted outside the threaded end;
the lifting assembly (4) comprises a lifting motor (41) having an output end provided with a worm (411), a worm wheel (42) is provided outside the worm (411), a screw rod (43) is tightly welded on the top of the worm wheel (42), a second lifting rod (44) is provided outside the screw rod (43), threads are provided inside the second lifting rod (44), the screw rod (43) is in threaded connection with the second lifting rod (44), and a stopper sleeve (45) is tightly welded outside the second lifting rod (44); a stopper (451) is mounted on one side of the stopper sleeve (45), a fixed sleeve (46) is provided outside the bottom of the stopper sleeve (45) in a sleeving manner, and the shape of the inner wall of the fixed sleeve (46) is the same as the shape of the outer wall of the stopper sleeve (45), and is used for limiting the stopper sleeve (45) to prevent the same from rotating;
the connecting assembly (2) comprises a movable piece (21) having one end connected with a first lifting rod (23) for lifting the wire by means of a socket (22), and the top of the outer end of the first lifting rod (23) is provided with a recess (231) for clamping the wire; and
the adjusting assembly (3) comprises a fixed seat (31) mounted on the other side of the movable piece (21), a rotating shaft (33) is provided on the fixed seat (31), a belt (34) is connected to the outside of the rotating shaft (33) and bound to the bracket of the electric pole, and the other end is connected to the outside of the fixed seat (31), both ends of the rotating shaft (33) pass through the side wall of the fixed seat (31) and are mounted with a toothed disc (32), outer walls at both ends of the fixed seat (31) are each provided with a bayonet, and the outside of the fixed seat (31) is provided with an adjusting handle (331) having one end capable of catching the bayonet of both ends of the fixed seat (31) and the bayonet of the toothed disc (32) to prevent the rotating shaft (33) from rotating.

2. The electrified wire lifting device according to claim 1, wherein a surface of the support plate (11) is provided with an adjusting hole near an upper end of the hook (12) for ensuring horizontal position adjustment of the hook (12).

3. The electrified wire lifting device according to claim 1, wherein the top end of the second lifting rod (44) is rotatably connected to the middle part of the connecting assembly (2) by means of a connecting shaft (441).

4. The electrified wire lifting device according to claim 1, wherein a handle (13) is mounted on the bottom of the locking assembly (1), and one end of the handle (13) is connected to the bottom of a worm wheel (42) for driving a screw rod (43) to rotate and then driving the second lifting rod (44) to lift and drop.

\* \* \* \* \*